United States Patent Office 3,157,635
Patented Nov. 17, 1964

3,157,635
SULFONIC ACID CATION EXCHANGE RESIN
PURIFICATION OF NUCLEOTIDES
Kuniyoshi Tanaka, Toyonaka, Komei Mizuno and Yasushi Sanno, Osaka, and Yukihiko Hamuro, Nishinomiya, Japan, assignors to Takeda Chemical Industries, Ltd., Osaka, Japan
No Drawing. Filed July 31, 1961, Ser. No. 127,838
Claims priority, application Japan, Aug. 5, 1960,
35/34,088
9 Claims. (Cl. 260—211.5)

This invention relates to the process for preparing nucleotides, comprising the separation and preparation of various nucleotides, each of said nucleotides being separately obtained by means of strongly acid sulfonic acid cation exchange resins from an acid or neutral mixture of nucleotides produced through the enzymatic degradation of nucleic acid.

The methods comprising the use of ion exchange resins, in general, have a great advantage in that they are less susceptible to the disturbing effects of other impurities, are regular, quantitative, and reproducible, and are capable of separating and processing the material into chemically pure constituents by applying the same procedure repeatedly to each fraction or treating the said fraction otherwise where it is impossible or at least difficult to attain the same purpose in any single treatment.

Most of the conventional methods, which have been known to be effective for the separation and prepartion of nucleotides, involving the use of ion exchange resins, make use of strongly basic anion exchange resins where the affinity of nucleotides for the ion exchangers is mainly derived from the strong adhesion that can occur between the strongly basic group of the resin and the phosphoric acid moiety of the nucleotides. From this reason, an elution of nucleotides requires a great quantity of solvent and a considerably long time. And, with the difference being so small in the affinity of various nucleotides for a given type of ion exchanger, it is necessary to provide as many types of solvents which are varied in acidity or ionic strength in order to separate those nucleotides respectively.

However, the studies carried out by the present inventors have made it clear that the nucleotides and other foreign substances obtainable from the degradation of nucleic acids vary in their affinity for a given sulfonic acid cation exchange resin in the free form, that it is therefore possible to isolate and prepare them separately by taking advantage of the said differential affinity, and also that the nucleotides are more or less adsorbed in acid media or in neutral media containing some inorganic salts on a strongly acid sulfonic acid cation exchange resin and this adsorption is rather complete where the pH of the said acid media is below 1.5.

The present invention represents the fruitful result of the investigations and studies carried out by the inventors based on the said new findings. The sulfonic acid cation exchange resins which can be successfully employed in the process embodying this invention may be either sulfonated phenolic, sulfonated polystyrene, or other resins, and neither the size of particles, the degree of cross-linking, nor the ion exchange capacity merits a major consideration. Thus, by way of example, Amberlite IR-120 (Rohm & Haas Co., Inc., Philadelphia, Pennsylvania, U.S.A.), Dowex 50 (Dow Chemical Co., Inc., Midland, Michigan, U.S.A.), Duolite C-3 (Chemical Process Co., Inc., Redwood City, California, U.S.A.) and Diaion SK#1 (Mitsubishi Chemical Industries, Limited, Tokyo, Japan) may be cited as the resins which can be advantageously employed for the purpose stated. These ion exchange resins can be obtained, for example, through the processes described in the text of Ion Exchange Resins (Robert Kunin, published by John Wiley & Sons, Inc., New York, N.Y., U.S.A.—pp. 82–85) and the literature cited therein as pertinent. Through the cross-linking of the resin is optionally selected, the resin may preferably contain 8–12 percent by weight of cross-linking agent e.g. divinylbenzene.

In the process embodying this invention, unlike the conventional processes utilizing strongly basic anion exchange resins, the bonding which may take place between the nucleotides and a given strongly acid cation exchange resin in the free form is presumably based on the affinity resulting from an ionic reaction of the basic moiety of nucleotides with the sulfonic groups of the ion exchanger. In view of the higher molecular weight of nucleotides it may be assumed that some intermolecular adsorption could also take place. The affinity of nucleotides for these resins slightly varies, and is considerably weak, and the said process, therefore, amounts to a great advantage, since it requires fewer kinds of solvent in less quantities than does any of the conventional processes for the purpose of elution.

The material containing a mixture of nucleotides to be employed in the precess embodying this invention may include, among others, the solution of a mixture of 5'-nucleotides obtained, for example, by the hydrolysis of the ribonucleic acid extracted from living tissues, some of the cultures of certain microorganisms, or their processed matters with an enzyme system. Such an enzyme system may be prepared from snake venom, or the mucous membranes of small intestines, or a culture of microorganisms (for example, those microorganisms which belong to a group of actiomyces, bacilli, fungi, etc.). Or, similar material in which 5'-adenylic acid is converted into 5'-inosinic acid with 5'-adenylic acid deaminase (some of the microorganisms mentioned above are capable of producing this enzyme) or through diazotization may be employed. Further, the solution containing a mixture of 5'-nucleotides which include 5'-inosinic acid obtained by the hydrolysis of nucleic acids or their partial hydrolyzates or a material containing them with an enzyme system capable of hydrolyzing nucleic acids as well as 5'-adenylic acid deaminase, may be used as the starting material.

This process is useful for purifying the solution containing a mixture of nucleotides, for it helps remove the various nucleosides, proteins, polysaccharides, and other impurities originated from living tissues, mycelia, and enzymes from the said solution.

The solution containing a mixture of 5'-nucleotides which constitutes the raw material for the purpose of this invention is preferably acid of pH 1 to 2, especially under pH 1.5. However, many of the afore-described starting materials, which are generally available for the purpose of this invention contain a rather high concentration of inorganic salts, but they can be adjusted to a suitable pH through the decationization which may be attained by reducing the concentration of inorganic salts by way of dilution or, if required, by adding some inorganic salt to the solution before the said materials are permitted to come in contact with the ion exchange resin.

The inorganic salts to be used for the purpose stated in the latter case may include the strong acid salts which are readily soluble in water, e.g., the halogenides of alkali metals, alkaline earth metals, ammonium and other similar substances, and the alkali metal salts and/or ammonium salts of sulfuric acid or the like.

The reason why the presence of these salts is useful for the purpose of this invention lies presumably in the fact that the acids obtained through an exchange of ions when these salts are allowed to come in contact with the free form of a strongly acid sulfonic acid cation exchange resin seals off the tendency of dissociation in the phosphoric acid moiety of the nucleotides to accelerate the dissociation of the base component, thereby widening the difference of adsorbability between the respective nucleotides. It is preferable, however, that the solution to be processed be partially desalted by dilution or through an electrodialysis utilizing an ion exchange membrane, for the presence of inorganic salts in excessive quantities may result in a forced desorption of the nucleotides which have previously been adsorbed by the acids produced through an exchange of ions.

It is also preferable that the solution containing a mixture of nucleotides be decationized by some suitable means before it is permitted to come in contact with a strongly acid sulfonic acid ion exchanger. One of the methods of decationizing the solution containing a mixture of nucleotides consists of permitting the aqueous solution containing a mixture of the degradation products of nucleic acids to flow through a column of strong-acid sulfonic acid resins in the free form, thereby allowing the cations other than nucleotides to be adsorbed by the said resinous exchanger. None of the nucleotides, then, is adsorbed, but they come out in the effluent so long as the resin is used in small quantities. Since a certain portion of the nucleotides is adsorbed, together with the other cations, by the ion exchanger when the resin is used in greater quantities, the amount of resin to be used for the purpose stated must be such that it is barely enough to adsorb the said cations only.

This decationizing operation is carried out in order to make the most of the least practical quantity of resin in the subsequent separatory process, and the foregoing method may be satisfactorily replaced by other operations, such as the ones involving the use of activated charcoal or ion exchange membranes, or utilizing the precipitation method or some other suitable means. If the material is composed of only inosinic acid and guanylic acid, where the material has been thoroughly decationized by an ion exchange resin, the subsequent separation requires no more resin than the equivalent of the fraction to be adsorbed, and since the cations have already removed and elutions are carried out with water, the free form of a strong-acid sulfonic acid cation exchange resin can be effectively reused over many cycles without regeneration.

As, in a number of cases, the water solution containing a mixture of the degradation products of nucleic acids has a rather high concentration of salts, the decationized solution usually exhibits a strong basicity, but in cases where the pH of the system is higher than 1.5, it is preferably reduced to pH 1.5 or lower by the addition of a mineral acid, e.g., sulfuric acid or other strong acid, before the solution may be permitted to be adsorbed on a strongly acid sulfonic acid resin in the free form.

Though the strongly acid sulfonic acid resin may adsorb enough nucleotides of the desired type in the vicinity of pH 2.0, it adsorbs practically all of the desired nucleotides where the pH of the system is below 1.5.

To achieve one of the preferred embodiments of this invention, such a procedure as is described below may be followed with considerable advantage. As the aqueous solution containing a mixture of the degradation products of nucleic acids is permitted to pass columnwise over a sulfonic acid cation exchange resin in the free form, most of the uridylic acid is not adsorbed but finds its way into the effluent, so that it can be successfully separated from the other nucleotides adsorbed by the resin, although some inosinic acid may also appear in the effluent. Further, as the resin is washed with water, guanylic acid almost free of uridylic acid but containing inosinic acid is obtained, and subsequently by means of a salt solution of a carefully controlled concentration, cytidylic acid and, with a certain time lag, adenylic acid free of cytidylic acid can be eluted.

If, as an alternative, after cytidylic acid is eluted by the said salt solution and the resin washed with water, an alkali solution such as dilute aqueous ammonia is permitted to flow through the column, adenylic acid free of nucleosides and other impurities is eluted. The salts in the salt solution which can be advantageously employed in the described process embodying this invention in order to elute the nucleotides are preferably those salts which have previously been described as practical additives for the solution containing a mixture of nucleotides.

The use of different eluants in this instance is based on the established fact that this practice is conducive to faster elution and less intermigration of ions.

Further, in order to obtain each nucleotide in its pure form, even such a careful selection of eluants as is described above is not sufficient per se, for even then it will still be difficult to obtain the desired degree of purification unless some procedural repetition is tolerated. This goal is often attained with success when each nucleotide is first isolated by means of the process embodying this invention, followed by the said process or some other suitable methods applied to each fraction. After each nucleotide is isolated as a more or less distinct fraction, the said fraction seldom contains more than three nucleotides, with the result that the preparation of each nucleotide in its highly pure form is greatly facilitated.

If a proper combination is selected of such procedures as the ones: in which the eluate is first neutralized with an alkali, or to the eluate is added a salt or an acid, which is followed by passage of the said eluate through the free form of a strongly acid sulfonic acid cation exchange resin, whereby the eluate is divided into the adsorbed portion and the effluent, and the portion adsorbed is further eluted for purification with the water which is weakly acid, neutral, or basic, or contains salts as described above; in which each acid eluate is permitted to come in contact with a suitable amount of activated charcoal, which thereupon adsorbs nucleotides, the said activated charcoal then rinsed and an elution continued with a basic aqueous solution to get rid of as much mineral acid as possible; in which, where 5′-nucleotides are present as water-soluble alkali salts in the eluate, the said eluate is permitted to pass through, for example, an equivalent quantity of a strongly acid sulfonic acid cation exchange resin in the free form to be decationized, and the nucleotides in the effluent are then converted into a hardly soluble salt of an alkaline earth metal; or in which, by taking advantage of the fact that many nucleotides are in the free form ready to crystallize from aqueous media, the solution of nucleotides in the free form thus obtained is concentrated to an extent that will allow them to crystalize; it is now possible to obtain each type of nucleotides in its pure form.

The conditions under which the solution containing nucleotides is permitted to contact a cation exchange resin, that is, the quantity of the resin to be based on that of nucleotides, the degree of dilution of the solution containing nucleotides, the salt concentration and pH of the solution, and the period of contact (flow rate), are all interrelated, so that the purpose of permitting the solution to contact the resin, the types of nucleotides, the required degree of purification and other factors are preferably taken into consideration before deciding the optimum conditions. The same consideration should also apply when the nucleotides adsorbed by the ion exchange resin is to be eluted.

The most significant industrial application of this process embodying this invention is the preparation of a mixture of 5′-inosinic acid and 5′-guanylic acid from a material containing 5′-nucleotides which include, among others, 5′-inosinic acid. Unlike other 5′-nucleotides, the said 5′-inosinic acid and 5′-guanylic acid are possessed of certain properties that will improve the taste or flavor of foods.

Furthermore, the seasoning effect is stronger when the said acids are used in conjunction than when either one of them is singly employed. Thus, it is more advantageous and useful for industrial purposes to prepare a mixture consisting of no other than 5'-inosinic acid and 5'-guanylic acid from the material containing a mixture of 5'-nucleotides in one operation than attempt to isolate these nucleotides in separate operations.

In the process embodying this invention, 5'-inosinic acid and 5'-guanylic acid emerge together in the eluate, spontaneously separated from the other 5'-nucleotides which are devoid of the seasoning properties or weak in such properties, and also the impurities which may otherwise find their way into the said fraction of the eluate.

Though this procedure may be carried out in more or less the same manner as in the preparation of the acids in separate operations, some care must be exercised in selecting the proper conditions under which the solution containing a mixture of nucleotides is permitted to contact with the free form of a strongly acid sulfonic acid cation exchange resin. Thus, the quantity of the resin to be based on that of nucleotides and the period of contact or flow rate must be carefully selected. If, for example, the rate of flow is: passage 1 liter/resin 1 liter/hour, even twice the quantity of resin that is enough to adsorb an equivalent quantity of the exchangeable ionic substances contained in the solution containing a mixture of nucleotides is not sufficient for complete adsorption of nucleotides, and many of the nucleotides find their way into the effluent. Likewise, three to four times the equivalent quantity of resin will permit the whole quantity of 5'-uridylic acid and half the quantity of 5'-inosinic acid to pass out in the effluent, and five times the equivalent quantity of the resin permit the whole quantity of 5'-uridylic acid and one third of the 5'-inosinic acid to pass out, while ten times the equivalent quantity of the resin will permit only 5'-uridylic acid to pass through and almost all the 5'-inosinic acid to be left in the resin. Thus, in cases where the solution containing a mixture of nucleotides which include 5'-inosinic acid is employed, it is first permitted to flow columnwise through the free form of a strongly acid sulfonated cation exchange resin, whose exchange capacity is approximately five times the equivalent quantity of the exchangeable ionic substances contained in the solution, and an elution is carried out with water, whereby it is possible to collect that mixed fraction of the eluate which contains 5'-inosinic acid and 5'-guanylic acid so that a mixture of 5'-inosinic acid and 5'-guanylic acid can be successfully prepared.

On the other hand, as the eluate, that is, that portion of the solution containing a mixture of nucleotides which passed through the resinous exchanger may contain certain nucleotides, i.e., 5'-uridylic acid and a portion of 5'-inosinic acid, as well as the acid and neutral impurities, it can be neutralized to a suitable salt concentration and 5'-inosinic acid separated chromatographically from the solution.

As occasion arises, a salt is added to the said mixed fraction containing 5'-guanylic acid to adjust the salt concentration and then the said chromatography is carried out to purify the said fraction so as to prepare the desired product.

The sulfonated polystyrene bead cation exchange resin employed in the following examples of the process embodying this invention are all characterized by particle sizes of 0.45 to 0.60 millimeter, an approximate ion exchange capacity of 1.9 milliequivalent per milliliter and cross-linkage agent containing 8 to 12 weight percent of cross-linking agent. The commercial products which satisfy these requirements include e.g. Amberlite IR 120 (Rohm & Haas Co., Inc.), Dowex 50–X8 (Dow Chemical Co., Inc.), Permutit Q (Permutit Co., Inc.) and Diaion SK#1 (Mitsubishi Chemical Industries, Ltd.), any of which can be employed with advantage for the purpose stated.

However, other sulfonated polystyrene cation exchange resins and sulfonated phenolic cation exchange resins are also usable for the purpose of this invention. And, in these examples is also employed a weakly basic anion exchange resin. The resin has an approximate exchange capacity of 3.0 milliequivalent per milliliter, and is commercially available under the trade name of e.g. Amberlite IR–4B from Rohm & Haas Company, Philadelphia, Pennsylvania, U.S.A.

Referring to the detailed descriptions of these examples, N denotes the normal unit of concentrations, l. liter or liters as the case may be, m. millimicron or millimicrons, cc. cubic centimeter or cubic centimeters, and g. gram or grams while all percent figures, unless otherwise specified, have been calculated on a weight basis.

EXAMPLE I

As the solution which contains a mixture of 5'-nucleotides and approximately 0.1 mole inorganic salt is obtained from the degradation of ribonucleic acid extracted from yeast by means of the enzyme solution prepared by culture of a strain of Actinomyces microorganism, is permitted to flow through a column of sulfonated polystyrene cation exchange resin (the free form) whose exchange capacity is twice to thrice the equivalent quantity of the exchangeable ionic substances at a flow rate of 1–2 l./resin 1 l./hour, the effluent (I) contains 5'-uridylic acid and 5'-inosinic acid, and the water eluate (II) contains 5'-guanylic acid as its principal ingredient, while as an approximately 0.01 to 0.1 N solution of sodium chloride is further permitted to flow through the resin at half the said flow rate, all the 5'-cytidylic acid appears in the eluate (III). Then, after the resin is washed with water, an approximately 0.1 to 1.0 N aqueous ammonia is permitted to flow at the same flow rate as was employed for the elution of 5'-cytidylic acid, a fraction (IV) containing 5'-adenylic acid is eluted in the vicinity of the point at which the eluate becomes neutral and a fraction (V) containing nuclueosides and amino acids in the basic phase of the elution cycle.

If the absorption coefficients of each fraction at pH 2 and at the wave lengths of 250 m$\mu$, 260 m$\mu$, 280 m$\mu$, and 290 m$\mu$ are measured and the absorbance ratios are calculated, the following values are obtained in many instances.

|      | 250 m$\mu$/260 m$\mu$ | 280 m$\mu$/260 m$\mu$ | 290 m$\mu$/260 m$\mu$ |
|------|-----------------------|-----------------------|-----------------------|
| (I)  | 0.75–0.85             | 0.4–0.5               | 0.1–0.4               |
| (II) | 0.9–1.0               | 0.6–0.7               | 0.4–0.5               |
| (III)| 0.5–0.7               | 1.0–1.7               | 0.7–1.3               |
| (IV) | 0.75–0.88             | 0.2–0.45              | 0.04–0.25             |

It should be noted that the values obtained for fraction (IV) were based on the fraction which ranges from pH 5 to pH 9 and in which portions of the adenosine and guanosine may have been included.

(a) *Preparation of 5'-guanylic acid.*—The 5'-guanylic acid fraction (II) thus obtained contains some impurities such as 5'-uridylic acid or 5'-inosinic acid, though the quantities may be usually small. The aqueous solution of this fraction is first neutralized with the aqueous solution of sodium hydroxide, which is followed by the addition of approximately 0.05 to 0.1 N sodium chloride, the resultant solution is passed columnwise through the free form of a sulfonated polystyrene cation exchange resin whose exchange capacity is approximately three to four times the total equivalent quantity of the cations and 5'-guanylic acid contained therein at a flow rate of 0.5 l./resin 1 l./hour whereby the 5'-uridylic acid as well as 5'-inosinic acid, which is an impurity in this instance, is eluted prior to 5'-guanylic acid, and this impurity is removed with a small quantity of running water, followed by further elution with water to collect the 5'-guanylic acid fraction.

As this fraction is further permitted to flow through a weakly basic anion exchange resin in the OH form in a ratio of 50 cc. resin per gram of the 5′-guanylic acid contained therein at a flow rate of 1.5 l./resin 1 l./hour, many chlorine ions find their way into the effluent, while most of the constituents which show ultraviolet absorptions at 260 mμ are adsorbed, so after the resin is washed with water, an elution is carried out with approximately 0.1 to 1.0 N aqueous ammonia to remove 5′-guanylic acid. The eluate is concentrated under reduced pressure and then permitted to pass through small amount of a sulfonated polystyrene cation exchange resin in the free form to remove ammonium ions and the effluent concentrated. The absorbance ratios of this concentrate at pH 2 is in accord with the respective literature values.

| Absorbance Ratios | 250 mμ/260 mμ | 280 mμ/260 mμ | 290 mμ/260 mμ |
|---|---|---|---|
| Test Results | 1.02 | 0.68 | 0.42 |
| Literature Values | 1.02 | 0.68 | 0.40 |

As the concentrated solution thus obtained is left standing overnight in a cold place after the addition of methanol, pure crystals of 5′-guanylic acid are obtained.

(b) *Preparation of 5′-cytidylic acid.*—The 5′-cytidylic acid fraction (III), which is obtained in the manner aforedescribed may contain a small quantity of 5′-guanylic acid. This fraction is first neutralized with the aqueous solution of sodium hydroxide, then permitted to flow columnwise through the free form of a sulfonated polystyrene cation exchange resin whose exchange capacity is three times the total equivalent quantity of the cations and 5′-cytidylic acid contained therein at a flow rate of 0.5–1.0 l./resin l./hour, and an approximately 0.01 to 0.05 N sodium chloride solution is further passed through the column to remove 5′-guanylic acid (if present, also 5′-uridylic acid and 5′-inosinic acid) in the first phase of the cycle, the resin is washed with water, and an approximately 0.1 to 1 N solution of aqueous ammonia is passed through the column, whereby the acid eluate is gradually made basic and the 5′-cytidylic acid entirely removed before the said eluate reaches pH 8.

This eluate is concentrated under reduced pressure and, when it contains the ammonium salt, is passed through a small amount of sulfonated polystyrene cation exchange resin in the free form to remove the cation, and the resultant solution is concentrated to obtain a concentrated solution of 5′-cytidylic acid.

The absorbance ratios of this concentrated solution is in good agreement with the respective literature values, substantiating the absence of amino acids, nucleosides and other nucleotides.

| Absorbance Ratios | 250 mμ/260 mμ | 280 mμ/260 mμ | 290 mμ/260 mμ |
|---|---|---|---|
| Test results | 0.47 | 1.95–2.0 | 1.5 |
| Literature values | 0.46 | 2.1 | 1.55 |

As the concentrated solution thus obtained is left standing overnight in a cold place after the addition of ethanol, highly pure crystals of 5′-cytidylic acid are obtained.

(c) *Preparation of 5′-adenylic acid.*—The 5′-adenylic acid fraction (IV) prepared in the foregoing manner is concentrated under reduced preessure to approximately one thirtieth the initial volume, some precipitated impurities are then filtered off, the filtrate is immediately passed columnwise through an equivalent amount of a sulfonated polystyrene cation exchange resin in the free form, the resultant eluate is then permitted to flow through a weakly basic anion exchange resin in the free form similar to the one used in (a) in a ratio of 50 cc. resin per gram of 5′-adenylic acid, whereby the 5′-adenylic acid is adsorbed by the resin, the resin is then washed with water thoroughly, followed by an elution with 1 N aqueous ammonia, the resultant eluate is further concentrated under reduced pressure and immediately passed again through an excess of a sulfonated polystyrene cation exchange resin in the free form, and as the effluent is collected, a concentrated solution of free 5′-adenylic acid is quantitatively obtained. Then, as this solution is further concentrated to approximately 15 times the quantity (exactly, the ratio is the same as 15 cc. to 1 g.) of the 5′-adenylic acid contained therein, and the concentrate is left standing in a cold place, 5′-adenylic acid crystals with decomposition points of 195° to 196° C. are obtained.

The yield of crystals upon recrystallization is approximately sixty percent in this instance. The absorbance ratios and the absorption coefficients of the product is in good accord with the respective literature values.

| Absorbance Ratios | 250 mμ/260 mμ | 280 mμ/260 mμ | 290 mμ/260 mμ |
|---|---|---|---|
| Test Results | 0.845 | 0.215 | 0.04 |
| Literature Values | 0.85 | 0.22 | 0.038 |
| Molecular Absorption Coefficient: | | | |
| Test Result | | | 41.2 |
| Literature Value | | | 41.1 |

Further, by concentrating the mother liquor, 5′-adenylic acid with over 95 percent purity can be prepared for a yield of 20 percent.

EXAMPLE II

As, after the 5′-cytidylic acid fraction (III) is separated in the manner described in Example I, an elution is continued with the aqueous solution of sodium chloride of the same concentration as in Example I (b), 5′-adenylic acid is eluted, no acidic amino acids will be observed until over eighty percent of the 5′-adenylic acid is eluted. (Thus, it is possible to prevent this fraction from being contaminated with nucleosides which will lag behind acidic amino acids in the cycle.)

As the 5′-adenylic acid fraction, which is strongly acid, is adjusted to pH 7.0 with sodium hydroxide, followed by passage columnwise through a strongly acid sulfonated polystyrene cation exchange resin in the free form in a ratio of 1 part of said fraction to 2–3 parts of resin, whereby 5′-adenylic acid is adsorbed by the resin, and an elution carried out with approximately 0.1 to 0.5 N aqueous ammonia, the resultant eluate gradually becomes basic and 90 to 95 percent of the total 5′-adenylic acid is eluted in a pH range of 5 to 8.5. This fraction is collected, followed by the concentration of the said fraction under reduced pressure, the concentrated solution is then decationized by passage over a slight excess of a sulfonated polystyrene cation exchange resin in the free form, the effluent is concentrated to 15 times the quantity of 5′-adenylic acid, and as the said concentrate is left overnight in a cold place, a good yield of crystalline 5′-adenylic acid having the same properties as those prepared in Example I (c) can be obtained.

EXAMPLE III

The solution containing a mixture of nucleotides which include 5′-inosinic acid and containing a 0.1 mole solution of sodium chloride, the said solution having been obtained by degradation of the ribonucleic acid derived from yeast with the enzyme solution obtained by culture of actinamyces, is permitted to pass columnwise through the free form of a sulfonated polystyrene cation exchange resin whose exchange capacity is five times the equivalent quantity of the exchangeable ionic substances contained therein at a flow rate of 1 l./resin 1 l./hour, followed by an elution with water, and the eluate which contains 5′-inosinic acid in the initial phase and 5′-guanylic acid in the subsequent phase is fractionated as such based on their absorbance ratios. As to the effluent, it is neutralized with sodium hydroxide, is brought to the same pH as the initial solution containing a mixture of nucleotides, and is permitted to pass over the ion exchange resin under the same conditions, which is further followed by an elution with water. The 5'-inosinic acid fraction of the eluate is collected.

(a) *Preparation of the sodium salt of 5'-inosinic acid.*— The 5'-inosinic acid fraction obtained by re-chromatography of the afore-prepared effluent is combined with the 5'-inosinic acid fraction of the said aqueous eluate, followed by the concentration of the combined solution under reduced pressure. The resultant concentrate is adjusted to pH 8.5 with aqueous ammonia, which is further followed by the addition of a 25% solution of barium acetate. The precipitated barium salt of 5'-inosinic acid is collected by filtration and is suspended in water. The resultant suspension is adjusted to pH 4.0 with hydrochloric acid, and is mixed with an equivalent quantity of a sulfonated polystyrene cation exchange resin in the sodium form. The mixture is vigorously agitated, followed by the removal of the resin from the system, the resultant solution then concentrated, further followed by the addition of ethanol, and the concentrated solution left standing overnight in a cold place to obtain the highly pure crystalline sodium salt of 5'-inosinic acid. The absorbance ratios of the crystals at pH 2 are in good accord with the respective literature values.

(b) *Preparation of the sodium salt mixture of 5'-inosinic acid and 5'-guanylic acid.*—The 5'-inosinic acid fraction obtained by re-chromatography of the effluent in the afore-described manner is combined with the fraction composed of 5'-inosinic acid and 5'-guanylic acid obtained from the aqueous eluate. The mixture is then concentrated under reduced pressure, and the procedures similar to those described in Example III (a) are followed to obtain the sodium salt of a mixture of the said acids.

EXAMPLE IV

The first step of the process consists of passing columnwise the solution containing a mixture of 5'-nucleotides and approximately 0.1 N of sodium chloride through the free form of a sulfonated polystyrene cation exchange resin whose exchange capacity is equivalent to the exchangeable ionic constituents contained therein at a flow rate of 1 l./resin 1 l./hour, where the said solution has been obtained by degradation of the ribonucleic acid extracted from yeast with the enzyme solution obtained from the culture of a strain of actinomyces microorganisms and 5'-adenylic acid deaminase, washing the column with a small quantity of water, and combining the resultant eluate with the effluent previously obtained. This combined solution contains all the nucleotides available, but no cations any more. In the second step of the process, the said combined solution is, if required, adjusted to pH 1.5 by the addition of a mineral acid such as hydrochloric acid, followed by passage over the ion exchange resin, the quantity of which is five times as much as that employed in the first step of the process, at a flow rate of 1 l./resin 1 l./hour, and finally water is passed through the resin at the same flow rate. The effluent includes 5'-uridylic acid and the acid and neutral impurities, while as to the adsorbed nucleotides 5'-inosinic acid starts being eluted in a pH range of 1.5 to 2.0 and then 5'-guanylic acid eluted between pH 3.4 and 4.0, while 5'-cytidylic acid is eluted in the last phase of the cycle. Incidentally, as to the said 5'-inosinic acid, one third of the total quantity is contained in the 5'-uridylic acid fraction.

(a) *Preparation of the sodium salt of 5'-inosinic acid.*— As the 5'-inosinic acid obtained in the foregoing manner contains some 5'-uridylic acid and 5'-guanylic acid, the quantities of which may be small, this fraction is adjusted to pH 1.5 with hydrochloric acid, followed by passage through a column of the free form of a sulfonated polystyrene cation exchange resin whose exchange capacity is five times the equivalent quantity of the 5'-inosinic acid contained therein at a flow rate of 1 l./resin 1 l./hour, an elution is carried out with water, and the 5'-inosinic acid fraction is collected from the first phase of the eluting cycle. The said fraction is concentrated under reduced pressure, followed by the addition of a small quantity of ammonia to adjust the said concentrated fraction to pH 8.5, which is further followed by the addition of a 25% aqueous solution of barium salt to allow the nucleotides to precipitate in the form of barium salts of nucleotides, which are then suspended in water, the said suspension adjusted to pH 4.0 with hydrochloric acid, followed by the addition of an equivalent quantity of the sodium form of a sulfonated polystyrene cation exchange resin, and the resultant mixture vigorously agitated to obtain an aqueous solution of the sodium salts of nucleotides.

As the said solution of sodium salts is concentrated, followed by the addition of sodium hydroxide to adjust the solution to pH 8, which is further followed by the addition of ethanol, and the resultant solution left standing in a cold place, the crystalline sodium salt of 5'-inosinic acid is obtained. The absorbance ratios of this salt are in good accord with the respective literature values, thus substantiating the absence of amino acids, nucleosides and other nucleotides.

(b) *Preparation of the sodium salt of 5'-guanylic acid.*— The 5'-guanylic acid fraction which is obtained in the foregoing manner and contains a small quantity of 5'-inosinic acid is adjusted to pH 1.5 with hydrochloric acid, followed by passage over a column of the free form of a sulfonated polystyrene cation exchange resin whose exchange capacity is five times the equivalent quantity of the 5'-quanylic acid contained therein at a flow rate of 1 l./resin 1 l./hour, an elution carried out with water, and the 5'-guanylic acid fraction is collected from the eluate. Then, by following the procedure similar to the one described in (a), the sodium salt of 5'-guanylic acid is obtained. The absorbance ratios of the said salt are in good accord with the respective literature values, thus substantiating the absence of amino acids, nucleosides and other nucleotides.

(c) *Preparation of a mixture of the sodium salts of 5'-inosinic acid and 5'-guanylic acid.*—The said 5'-guanylic acid fraction of the effluent is removed in the foregoing manner, and an elution is carried out by means of water to collect the fraction of a pH range of 1.5 to 4.0. This fraction corresponds to the fraction composed of 5'-inosinic acid and 5'-guanylic acid, and contains, also, small quantities of 5'-uridylic acid. As the said fraction is adjusted to pH 1.5 with hydrochloric acid, followed by passage over a column of the free form of a sulfonated polystyrene cation exchange resin whose exchange capacity is five times the total equivalent quantity of 5'-inosinic and 5'-guanylic acids contained therein at a flow rate of 1 l./resin 1 l./hour, a fraction of the water eluate again collected over a pH range of 1.9 to 3.6, and the resultant solution treated in the afore-said manner to obtain sodium salts, a highly pure mixture of the sodium salts of 5'-inosinic and 5'-guanylic acids is obtained.

EXAMPLE V

In this example, instead of the free form of a sulfonated polystyrene cation exchanger in Example 4 activated charcoal is employed for decationization of the solution of a mixture of nucleotides. In this example, though decationization may not be as complete as in the resin process, it is nevertheless possible to reuse the resin, which is employed in the second stage of the process, over many cycles without regeneration.

In the present example of this invention, the solution of a mixture of nucleotides is adjusted to pH 1.5, followed by passage through activated charcoal for adsorption, the charcoal is then washed with water, and the eluted cations are removed.

When no more cation can be detected in the aqueous eluate, nucleotides are eluted with an ammoniacal aqueous ethanol and the resultant eluate is concentrated under reduced pressure. By this means, the decationized solution of a mixture of nucleotides can be obtained. In the second step of the process, the solution is treated in a manner similar to the one described in Example IV by means of the free form of a sulfonated polystyrene cation exchange resin whose exchange capacity is 10 times the equivalent quantity of exchangeable ionic substances contained in the said solution. The yield of nucleotides in the 5'-inosinic acid fraction is over 90 percent.

Thereafter, a series of procedures similar to the ones described in Example IV, is followed to obtain the sodium salts of 5'-inosinic and 5'-guanylic acids, and of a mixture of 5'-inosinic and 5'-guanylic acids.

In the above examples, the 5'-nucleotides-containing mixture was prepared in such a manner that an aqueous yeast extract is allowed to react with a liquid containing an enzyme-system of microorganism, capable of hydrolyzing ribonucleic acid into 5'-nucleotides. As the enzyme liquor, the culture filtrate of the microorganism specified hereinunder was employed.

To prepare the 5'-nucleotides mixture used in Examples I and II, *Streptomyces albogriseolus* (of which identical specimen has been filed with Northern Utilization Research Branch of U.S. Department of Agriculture under the accession number of NRRL B–1305) was employed, and in the preparation of 5'-nucleotides mixture of Examples III, IV and V, there was employed *Streptomyces aureus* (of which identical specimen has been filed with American Type Culture Collection under the accession number ATCC 13404), which can produce 5'-adenylic acid deaminase concomitantly with an enzyme system capable of hydrolyzing nucleic acid into 5'-nucleotides. Other microorganisms may of course be employed for the purpose so long as they can produce such enzyme system. For example, microorganisms in the following list can all be applicable for the same purpose.

*\*Streptomyces griseus* (Krainsky emend, Waksman et al.) Waksman et al. IFO 3430, ATCC 10137
*Streptomyces viridochromogenes* (Krainsky) Waksman et Henrici Waksman's strain
*\*Streptomyces purpurescens* Lindenbeim IFO–3389, NRRL B–1454
*\*Streptomyces coelicolor* (Müller) Waksman et Henrici IFO 3807, ATCC 13405
*\*Helminthosporium sigmoideum* var. *irregulare* Cralley et Tullis IFO 5273, ATCC 13406
*Bacillus brevis* Migula emend. Ford ATCC 8185
*Bacillus subtilis* Cohn emend. Prazmowski IFO 3032, ATCC 13407
*Anixiella reticulispora* Saito et Minoura IFO 5483, ATCC 13828
*\*+Aspergillus elegans* Gasperini IFO 4286, ATCC 13829
*+Aspergillus flavipes* (Bainier et Sartory) Thom et Church IFO 4052, ATCC 13830
*+Aspergillus fischeri* Nehmer IFO 5866, ATCC 13831
*+Aspergillus melleus* Yukawa IFO 4339, ATCC 13832
*+Aspergillus nidurans* (Eidam) Winter IFO 5713, ATCC 13833
*\*Botryosphaeria ribis chromogena* G. et D. IFO 4837, ATCC 13834
*\*Chaetomidium japonicum* Saito et Okazaki IFO 4451, ATCC 13935
*\*+Glomerella cingulata* (Stomem.) Spauld. et v. Schr. IFO 5907, ATCC 13836
*\*Neurospora crassa* Shear et Dodge IFO 6067, ATCC 13837
*Neurospora sitophilia* Shear et Dodge IFO 6069, ATCC 13838
*\*Ophiobolus miyabeanus* Ito et Kuribayashi IFO 4870, ATCC 13839
*\*Ophiostoma ulmi* (Buisman) Nannf. IFO 6128, ATCC 13840
*\*Sordaria fimicola* (Rab.) Cesari et de Notaris IFO 4846 ATCC 13841
*\*Tilachlidium humicola* Oudemans IFO 5696, ATCC 13842

In the microorganisms presented above, numbers attached to the names of species of microorganisms show the respective accession numbers of the strain used in Institute for Fermentation, Osaka, Japan (IFO), Northern Utilization Research Branch of U.S. Department of Agriculture, Peoria, Ill., U.S.A. (NRRL) or American Type Culture Collection, Washington, D.C., U.S.A. (ATCC).

In the list of microorganisms, microorganisms marked with asterisk (\*) produce phosphatase together with the enzyme system capable of degrading ribonucleic acid into 5'-nucleotides. Therefore when these microorganisms are employed, phosphatase inhibitor may preferably be added when the yeast extract is hydrolysed. When sodium arsenate is used as the inhibitor, the concentration of the inhibitor in the reaction mixture may be about $6 \times 10^{-3}$ moles per liter. Among the afore listed microorganisms, those marked with a cross (+) produce 5'-adenylic acid deaminase concomitantly with the enzyme system capable of hydrolyzing nucleic acid into 5'-nucleotides. From this, the hydrolyzate obtained by the use of these microorganisms contains 5'-inosinic acid besides 5'-guanylic acid, etc.

Having thus disclosed the invention, what is claimed is:

1. Process for separating 5'-nucleotides comprising contacting aqueous solution of said nucleotides at pH of 1 to 2, said solution being substantially free of cation impurities, with free form of sulfonic acid cation exchange resin, and subsequently eluting said nucleotides with aqueous sodium chloride solution.

2. The process claimed in claim 1, wherein the aqueous solution of 5'-nucleotides is hydroylzate of nucleic acid.

3. The process claimed in claim 1, wherein the sulfonic acid cation exchange resin is a sulfonated polystyrene bead cation exchange resin whose approximate ion exchange capacity is 1.9 milliequivalents per milliliter, and cross-linkage is 8 to 12 weight percent of cross-linking agent.

4. Process for preparing mixture constaining 5'-inosinic acid and 5'-guanylic acid, which comprises contacting at pH between 1 and 2 with free form of sulfonic acid cation exchange resin an aqueous solution containing 5'-inosinic acid and 5'-guanylic acid together with other nucleotides from which cations are previously removed, and subsequently eluting 5'-inosinic acid and 5'-guanylic acid with water.

5. The process claimed in claim 4, wherein the aqueous solution containing 5'-inosinic acid and 5'-guanylic acid together with other nucleotides is hydrolyzate of nucleic acid.

6. The process claimed in claim 4 wherein the sulfonic acid cation exchange resin is a sulfonated polystyrene bead cation exchange resin whose approximate ion exchange capacity is 1.9 milliequivalents per milliliter, and the cross-linkage is 8 to 12 weight percent of cross-linking agent.

7. Process for preparing mixture containing 5'-inosinic acid and 5'-guanylic acid, which comprises contacting with free form of sulfonic acid cation exchange resin an aqueous solution containing 5'-inosinic acid and 5'-guanylic acid together with other nucleotides from which cations are previously removed, the solution containing sodium chloride in concentration of 0.05 to 0.1 normal, and subsequently eluting 5'-inosinic acid and 5'-guanylic acid with water.

8. The process claimed in claim 7, wherein the aqueous solution containing 5'-inosinic acid and 5'-guanylic acid together with other nucleotides is hydrolyzate of nucleic acid.

9. The process claimed in claim 7, wherein the sulfonic acid cation exchange resin is a sulfonated polystyrene bead cation exchange resin whose approximate ion exchange capacity is 1.9 milliequivalents per milliliter, and the cross-linkage is 8 to 12 weight percent of cross-linking agent.

References Cited in the file of this patent

UNITED STATES PATENTS

| | | |
|---|---|---|
| 2,870,139 | Kagan | Jan. 20, 1959 |
| 2,891,945 | Stark | June 23, 1959 |

OTHER REFERENCES

Cohn: Science, vol. 109, pp. 377–378 (April 15, 1949).